Oct. 12, 1965 W. HERGERT 3,211,370

PUNCHING AND TRANSPORTING APPARATUS FOR RECORD CARRIERS

Filed Dec. 19, 1963 2 Sheets-Sheet 1

INVENTOR
Wilhelm Hergert

BY: Michael J. Striker
ATTORNEY

PUNCHING AND TRANSPORTING APPARATUS FOR RECORD CARRIERS

INVENTOR
Wilhelm Hergert

BY: Michael J. Striker
ATTORNEY

United States Patent Office 3,211,370

Patented Oct. 12, 1965

3,211,370
PUNCHING AND TRANSPORTING APPARATUS FOR RECORD CARRIERS

Wilhelm Hergert, Wilhelmshaven, Germany, assignor to Olympia Werke A.G., Wilhelmshaven, Germany Filed Dec. 19, 1963, Ser. No. 331,973
Claims priority, application Germany, Dec. 24, 1962, O 9,152
20 Claims. (Cl. 234—50)

Figure 1:
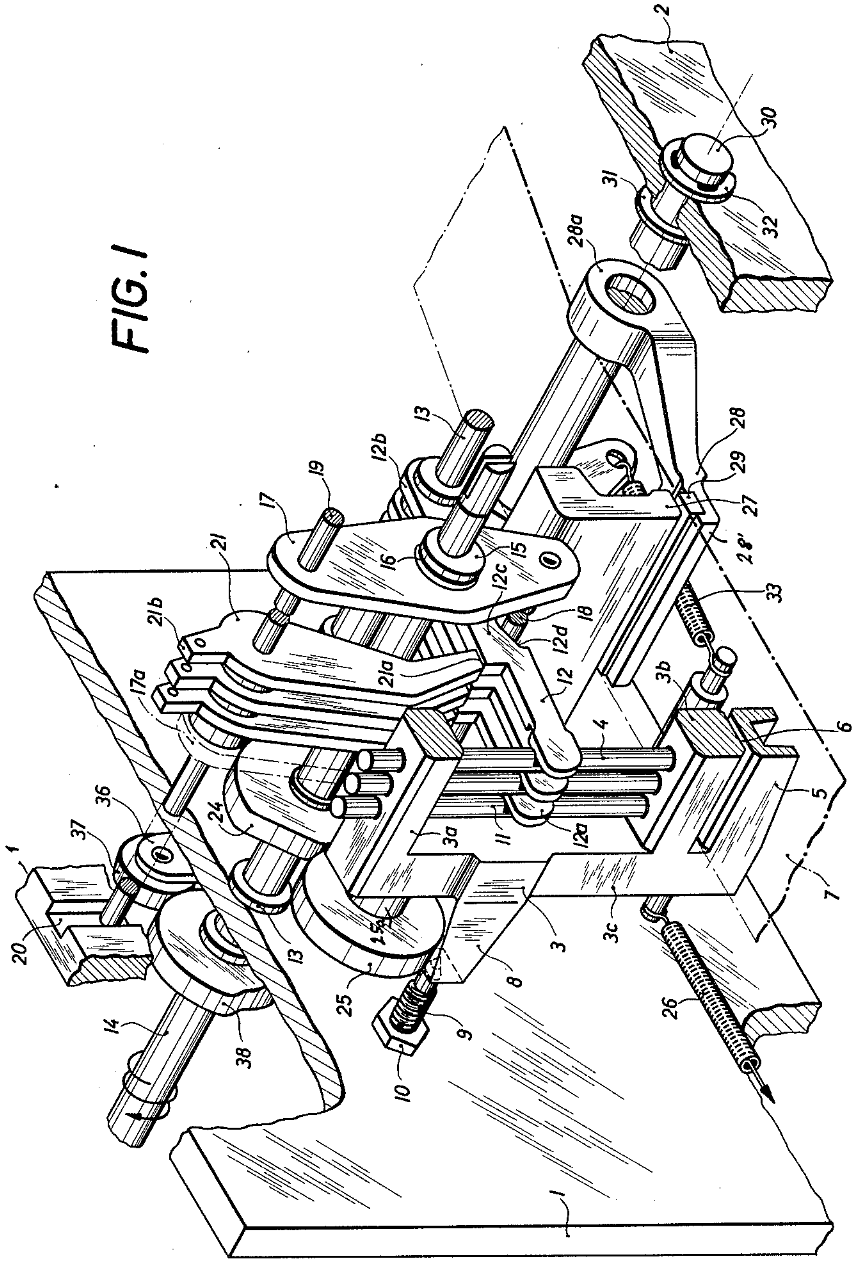

The present application is a continuation-in-part of my copending application Serial No. 240,301 entitled "Perforator for Record Carriers" and filed on November 27, 1962, now Patent No. 3,133,698.

The present invention relates to a punching and transporting apparatus for punching perforations into a record carrier and for transporting the same. The record carrier may be a tape or a punch card and consist of a suitable sheet material. More particularly, the present invention relates to a punching apparatus in which punches penetrating the record carrier are moved to effect transport of the record carrier.

Punching devices according to the known art provide transporting rollers for moving the record carrier past a stationary row of punches. The speed of punching devices of this type is limited. Other punching devices of the known art provide a reciprocating transporting member which clamps the record carrier during one reciprocating stroke to effect stepwise movement of the record carrier to the punches.

The punching and transporting devices according to the prior art have the disadvantage that a certain relative movement between the record carrier and the punch moving to the punching position is unavoidable. A complete synchronization between the operation of the transporting means for the record carrier, and the movement of the punches to and from the punching positon is difficult to achieve and to maintain. Furthermore, the known transporting devices for record carriers are incapable of transporting the record carrier exactly the same distance during each step so that the very small errors are compounded when a great number of punched perforations are made along the length of a record carrier tape.

It is one object of the present invention to overcome the disadvantages of known punching and transporting apparatus for record carriers, and to provide a punching and transporting apparatus of extremely simple construction which reliably operates and assures perfect synchronization between the movement of the transported record carrier, and the movement of punches to and from a punching position.

Another object of the present invention is to assure that the record carrier is at a complete standstill when punching means penetrate the record carrier during a punching operation.

Another object of the present invention is to control the movement of the punches and the transport of a record carrier from a single drive shaft.

Another object of the invention is to provide a punching and transporting apparatus in which the record carrier is transported stepwise for exactly the same distance before each punching operation, irrespective of the thickness of the record carrier, which may be a tape or a punch card.

Another object of the present invention is to provide a punching and transporting apparatus in which the mass of the moving elements is a minimum.

With these objects in view, the present invention relates to a punching and transporting apparatus for a record carrier, such as a tape or punch card, and comprises punch means movable between an inoperative position and an operative position penetrating a record carrier, and means for moving the punch means in a transporting direction while it is in the operative position and for moving the punch means in an opposite direction while it is in the inoperative position. The punch means in the operative position transports the record carrier in the transporting direction and then moves back in an opposite direction while being in the inoperative position so as to be ready at the end of the return stroke to again move to the operative position penetrating the record carrier.

One embodiment of the invention comprises a support having a portion movable along a path on which a record carrier is located; a plurality of punches mounted on the support for movement with the same and for movement in a direction transverse to the path between an inoperative position and an operative position penetrating the record carrier; and control means for actuating selected punches and for moving the support means along the path of the record carrier in such a timed relationship that the selected punches are in the operative position and transport the record carrier while the support means moves in one direction, and are in the inoperative position releasing the record carrier while the support means moves in a return direction.

In the preferred embodiment of the invention, first control means including an eccentric cam driven from a drive shaft control the punching movement of punches, and second control means including a cam on the drive shaft control an angular reciprocating movement of the support means on which the punches are mounted.

The support means are preferably constructed as a rectangular frame provided with a row of guide bores in which rod-shaped punches are mounted. The frame has an anvil portion defining a laterally open slot for receiving the record carrier, such as a tape or record card. The first control means also include selector members which are preferably operated by electromagnetic means to connect selected punches with the drive means, while other punches remain inoperative.

The cam which controls the reciprocating movement of the support frame on which the punches are mounted, has such a shape that the support frame stops for awhile in the two dead center positions of its reciprocating movement which facilitates accurate penetration of the record carrier by the punches, and withdrawal of the punches from the record carrier.

Third control means including a cam driven by the drive shaft are provided for operating a holding means for preventing movement of the record carrier during the return stroke of the reciprocating support frame.

Figure 2:
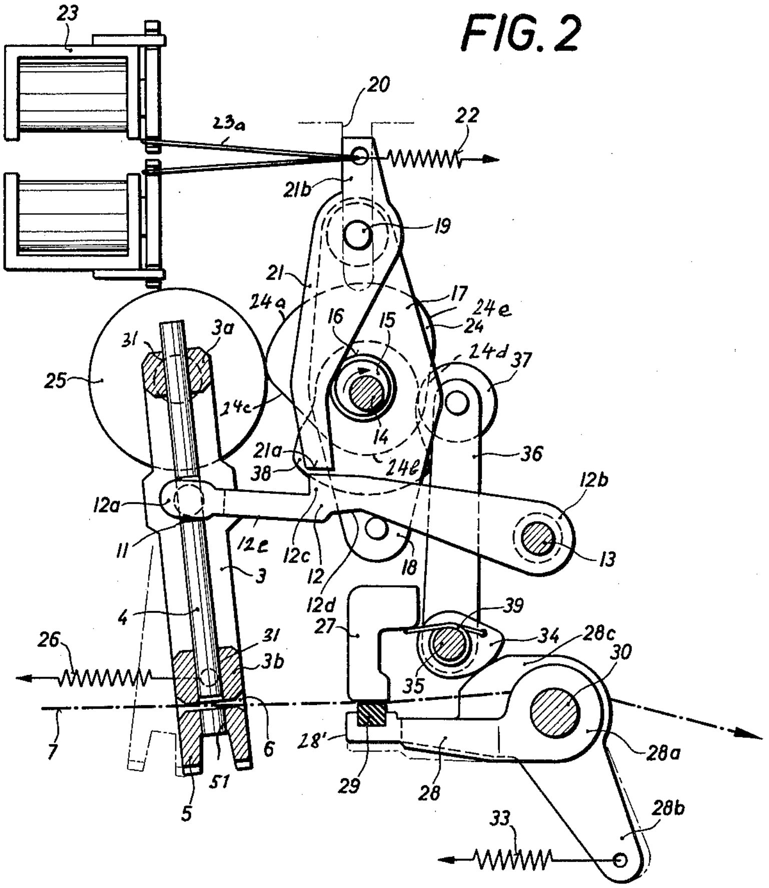

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary perspective view illustrating an embodiment of the invention; and FIG. 2 is a side view, partially in section, illustrating the embodiment of FIG. 1.

Referring now to the drawing, and more particularly to FIG. 1, two vertical walls 1 and 2 support the device. The walls are shown broken off for the sake of clarity. A row of punches 4 is mounted on support means which include a frame 3 having a pair of upper and lower horizontal frame portions *3a* and *3b*, and a pair of vertical frame portions *3c* of which only one is visible in FIG. 1. Each of the vertical frame portions *3c* has a laterally projecting arm 8 provided with a conical bearing recess into which the pointed conical end of a journal screw 9 projects. Nuts 10 secure the journal screws 9 to walls 1 and 2. Support frame 3 is thus mounted for rocking movement about a horizontal axis defined by journal screws 9, and the position of bearing portion 8 and of journal screws 9 is so selected that frame 3 swings about its center of gravity and has little inertia.

An anvil portion 5 is part of frame 3 and extends parallel to the lower frame portion 3*b*, defining with the same a slot 6. While slot 6 is closed by the vertical frame portion 3*c* shown in FIG. 1, it extends through the other frame portion 3*c*, not shown, so that the slot is laterally open and permits lateral insertion of a record card which is wider than the length of the open slot 6.

As best seen in FIG. 2, frame portions 3*a* and 3*b* have pairs of aligned bores 31 in which punches 4 are guided. Anvil portion 5 has a row of corresponding bores 51 so that punches 4 penetrating a record carrier 7 are received in the anvil bores 51.

While only three punches are illustrated, it will be understood that any number of punches can be provided along the horizontal portions 3*a* and 3*b* of the support frame 3*c*. Five, eight, or any number of punches may be used in accordance with the code used in perforating record carrier 7.

Each punch 4 has in the center region thereof a lateral cutout 11 in which the end portion 12*a* of an actuating lever 12 is located. A shaft 13 supports the other end portions 12*b* of the row of actuating levers 12 for turning movement. Each actuating lever 12 has a high abutment portion 12*c* and a lower portion 12*e* separated by a steep shoulder from abutment portion 12*c*. A recess 12*d* is formed on the underside of each actuating lever 12 in the region of the abutment portion 12*c*. Abutment portions 12*c* are respectively located opposite end faces 21*a* of a row of selector members 21 which are mounted on a shaft 19 for turning movement between the position illustrated in the drawing, and an angularly displaced position in which the end face 21*a* is located opposite the lower portion 12*e* of the respective actuating lever 12. Two rows of staggered electromagnetic selector means 23 are connected by links 23*a* to arms 21*b* of selector members 21 so that by selective energization of electromagnetic selector means 23, selected selector members 21 are held in the operative position shown in FIG. 2, whereas in the event that the respective electromagnetic selector means 23 is not energized, a spring 22 will turn the respective selector member 21 to an inoperative position located opposite the lower portion 12*e* of the corresponding actuating lever. As will be explained in greater detail hereinafter, shaft 19 with all selector members 21 is caused to perform an up and down movement, and those actuating levers 12 whose associated selector members 21 are in the illustrated operative position, will be turned downward and cause downward movement of the corresponding punches 4. However, if a non-selected selector member is in its inoperative position in which its end face 21*a* is located opposite the lower portion 12*e* of the corresponding actuating lever, the downward movement of the respective selector member will not cause an engagement of the actuating lever by the selector member, and the corresponding punch will not be actuated to move downward.

A main drive shaft 14 is mounted in bearings 14*a* supported on walls 1 and 2 and carries a pair of fixed eccentric members 15 for rotation therewith. Two connecting means 17 and 17*a* are mounted on eccentric members 15. The upper ends of connecting means 17 and 17*a* are connected by shaft 19 on which selector members 21 are mounted. The ends of shaft 19 are guided in vertical slots 20 in walls 1 and 2 so that during rotation of drive shaft 14 and oscillation of connecting means 17 and 17*a* by eccentric members 15, shaft 19 is guided to perform a vertical rectilinear movement together with all selector members 21, irrespective of the angular position of selector members 21 in relation to shaft 19. The lower ends of connecting members 17 and 17*a* are connected by a rod 18 which extends across the underside of actuating levers 12 so that the same rest on a rod 18 due to the action of gravity. In this position of actuating levers 12, the end faces 21*a* of selector members 21 are slightly spaced from the abutment portions 12*c* so that an angular movement of selector members 21 under the control of electromagnetic selector means 23 will not be obstructed by friction. Selector members 21 are of angular shape to provide room for drive shaft 14, as best seen in FIG. 2. Rod 18, drive shaft 14 and shaft 19 are located in a common plane which extends substantially in the vertical direction of guide slot 20, and the angular shape of selector members 21 positions the end faces 21*a* near this plane.

During rotation of drive shaft 14, shaft 19 and the upper end portions of connecting means 17, 17*a* perform a straight vertical reciprocating movement, while rod 18 moves along an endless almost circular path. Since all actuating levers 12 rest on rod 18, they will tend to follow rod 18 during the downward movement of the same, but when the corresponding punches 4 engage the record carrier 7, actuating lever 12 and punches 4 will be held since the weight of punches 4 and actuating levers 12 is insufficient for perforating the record carrier. However, those punches whose selector members 21 are in the illustrated position, will be pushed down by the downwardly moving shaft 19 so that the corresponding punches 4 will perforate the record carrier. When connecting means 17, 17*a* are moved upwardly by eccentric members 15, selector members 21 and rod 18 will simultaneously move upward so that all actuating levers 12 are raised and retract punches 4 to the inoperative position shown in FIG. 2.

In addition to the control means 15, 17, 18, 19, 12 which control the movement of punches 4 between inoperative and operative positions, second control means are provided for rocking support frame 3 and anvil portion 5 about the axis provided by journal screws 9. A circular roller 25 is mounted on a laterally projecting shaft 25*a* which is secured to the vertical frame portion 3*c*. Drive shaft 14 carries a fixed cam 24 cooperating with roller 25. A spring 26 is secured to a stud projecting from frame portion 3*c* and biases frame 3 to turn in clockwise direction as viewed in the drawing so that roller 25 abuts the peripheral surface of cam 24, as best seen in FIG. 2. Cam 24 has two circular cam track portions 24*a* and 24*b*, a substantially straight cam track portion 24*c*, a shorter substantially straight cam track portion 24*d*, and a rounded cam track portion 24*e* connecting portions 24*a* and 24*d*. Since cam track portion 24*a* is farthest spaced from the axis of rotation of cam 24 and drive shaft 14, support frame 3 will be in the dead center position illustrated in FIG. 2 as long as roller 25 is engaged by cam track portion 24*a*. As long as roller 25 is engaged by the circular cam track portion 24*b* which is closest to the axis of cam 24, support frame 3 will be held in the other dead center position illustrated in chain lines in FIG. 2. Shaft 14 and cam 24 turn in clockwise direction as viewed in FIG. 2 and due to the shape of cam track portion 24*c*, support frame 3 will rapidly swing in clockwise direction under the action of spring 26 during engagement of roller 25 by cam track portion 24*c*. After the circular cam track portion 24*b* has held support frame 3 in the left dead center position, cam track portion 24*d* will cause support frame 3 to turn rapidly in counterclockwise direction, but such movement will be slowed down before support frame 3 reaches the position illustrated in solid lines, since the curved cam track portion 24*e* gradually approaches circular shape.

FIG. 2 illustrates a position of cam 24 in which support frame 3 is still in the right hand dead center position, but is about to start its movement to the left.

Holding means are provided for holding record carrier 7 when the same is not transported. A stationary clamping member 27 is mounted on walls 1 and 2 in a position above record carrier 7, and has a bottom face cooperating with a bar 29 consisting of a material having a high friction coefficient. Bar 29 is mounted in a corresponding groove of a bar 28′ which is mounted on a pair of lever arms 28 secured to a shaft 30. Shaft 30 is mounted in bearings in walls 1 and 2 and secured against axial movement by spring rings 31, 32. An arm 28*b* is secured to shaft 30 rearwardly of wall 1, and is biased by a spring 33 to turn arms 28 to the position illustrated in solid lines in FIG. 2 in which the record carrier 7 is clamped between the clamping bar 29, 28′ and the fixed clamping bar 27. A cam 34 is fixed on a shaft 35 which is mounted for turning movement on wall 1 and cooperates with a cam portion 28*c* forming part of the lever arm 28*b*. A control lever 36 is fixed to shaft 35 and carries a cam follower roller 37 cooperating with a cam 38 fixed on drive shaft 14.

Cam 38 has two diametrically arranged circular cam track portions of different radius, and two opposite connecting cam track portions. A spring 39 surrounding shaft 35 abuts at one end the stationary clamping member 27, and has the other end thereof projecting into a hole of cam 34 so that the same, shaft 35, lever 36, and cam follower roller 37 are biased to turn in counterclockwise direction as viewed in FIG. 2 into a position in which roller 37 abuts cam 38.

During rotation of drive shaft 14, the third control means 38, 37, 36, 35, 34 will move the clamping means 28, 28′ to and from the illustrated holding position in which movement of record carrier 7 is prevented.

Cam 38 is designed so that record carrier 7 is clamped and held stationarily during the movement of support frame 3 with punches 4 from the position illustrated in solid lines to the position illustrated in chain lines in FIG. 2, whereas the record carrier is released when support frame 3 moves in the opposite direction. Cam 28 has such a shape that the time for opening and closing the clamping jaws is comparatively short so that the record carrier is held, or released, respectively in exactly defined moments of the operation.

A pin may be substituted for bar 29 and pass through a perforated hole in record carrier 7 in the illustrated operative position of member 28, 28′. Irrespective of whether the record carrier is held by frictional engagement, or by a pin, holding means are necessary to prevent undesired movement of the record carrier.

*Operation*

A drive motor, not shown, rotates drive shaft 14 with eccentric members 15 so that connecting means 17, 17*a* perform a reciprocating movement together with shaft 19 and rod 18. Electromagnetic selector means 23 may be deenergized at this time so that springs 22 turn selector members 21 to an inoperative position in which end faces 21*a* are located opposite the lower portion 12*e* of actuating levers 12. Therefore, the up and down movement of selector members 21 will have no influence on actuating levers 12 and punches 4.

A record carrier 6 is inserted into slot 7 and threaded between clamping members 29 and 27. Rod 18 will move along an endless path and will raise actuating levers 12 during the upward movement thereof and permit dropping of actuating levers 12 during the downward movement thereof until the ends of punches 4 abut record carrier 7 and prevent further downward movement of actuating levers 12 whose weight is insufficient to effect a perforation of the record carrier.

Cam 24 turns with drive shaft 14 and effects a reciprocating angular motion of support frame 4 about the axis of journals 9 so that punches 4 perform a corresponding rocking movement, turning about the end portions 12*a* of actuating levers 12.

The walls of slot 6, and the end faces of punches 4 will slide along record carrier 7 during the reciprocating rocking motion of support frame 3. Holding means 27, 29 will hold record carrier 7 during movement of portions 3*b* and 5 to the left as viewed in FIG. 2.

Assuming that some of punches 4 are to be selected for punching a group of holes representing coded information into record carrier 7, some of electromagnetic selector means 23 will receive electric pulses and attract their armatures so that the corresponding selector members 21 will be turned by links 23*a* in counterclockwise direction to the position illustrated in FIG. 2, while the remaining non-selected selector members 21 will be held by the respective springs 22 in the above-described inoperative position.

Selector members 21 in operative position will move down in the direction of slot 21*b* together with shaft 19 and engage the corresponding actuating levers 12 on abutment portions 12*c* so that the corresponding punches 4 move down to a position in which the ends thereof are located in the bores of anvil portion 5 whereby the record carrier is perforated and provided with a coded group of holes. Due to the fact that eccentric cam 24 and eccentric member 15 are both secured to shaft 14, cam 24 rocks support frame 3 with punches 4 in a timed relation with the movement of the punches from the inoperative position shown in FIG. 2 to the operative position penetrating record carrier 7. Selected punches 4 will move down and perforate record carrier 7 while support frame 3 is in the position illustrated in chain lines in FIG. 2 and at a standstill due to the circular shape of cam track portion 24*b*. The actuated punches will remain in a position projecting through the new perforations in record carrier 7 while support frame 3 moves to the right as viewed in FIG. 2 to the illustrated position shown in FIG. 2. While support frame 4 is held stationarily in this position by the circular cam track portion 24*a*, rod 18 moves upward along its endless path and first raises actuating levers 12 of the actuated punches so that the same are retracted to a position in which the end faces thereof are located above record carrier 7, and at this time also engages actuating levers 12 of the non-selected punches whose end faces were resting on the record carrier during the movement of the punches from the left to the right as viewed in FIG. 2.

Since the actuated punches 4 couple record carrier 7 to the support frame 3, record carrier 7 is shifted to the right during the movement of support frame 3 from the left to the right. When support frame 3 has arrived in its right hand dead center position, holding means 29, 27 engage and hold the record carrier, and prevent any slipping of the record carrier in slot 6 after the actuated punches have been retracted.

During further rotation of drive shaft 14 with cam 24, the shape of cam 24 permits spring 26 to turn support frame 3 in clockwise direction so that the clamped or otherwise held record carrier 7 slides in slot 6. Consequently, punches 4 are located opposite an unperforated portion of record carrier 7 when they are next actuated.

The opening and closing of holding means 27, 29 is in such a timed relationship with the movement of the punches that record carrier 7 is held to the moment in which punches 4 perforate the record carrier, and after the moment in which punches 4 release the record carrier. Due to this operation, very precise stepwise shifting of the record carrier 7 is achieved, and the perforations produced during each actuation of the punches are very precisely spaced from each other even at high operational speeds.

The apparatus of the invention permits it to maintain a tolerance of $\pm 0.02$ mm. of the given distance between perforations, even at very high transporting speeds of the tape.

It will be understood that each of the elements described above, or two or more together, may also find a useful application in other types of punching and transporting apparatus differing from the types described above.

While the invention has been illustrated and described as embodied in a punching and transporting apparatus comprising punches mounted on a reciprocating support, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Punching and transporting apparatus for record carriers, comprising, in combination, means for guiding a record carrier along a predetermined stationary path and for preventing the record carrier from moving in a direction transversal to said path; punch means movable between an inoperative position and an operative position for perforating the record carrier; first control means for moving said punch means between said positions; second control means for moving said punch means in a transporting direction and in a opposite return direction; and drive means for driving said first and second control means in timed relationship so that said second control means move said punch means in said operative position in said transporting direction whereby the record carrier is transported along said predetermined path and so that said second control means move said punch means in said return direction while said punch means is in said inoperative position.

2. Punching and transporting apparatus for record carriers, comprising, in combination, means for guiding a record carrier along a predetermined stationary path and for preventing the record carrier from moving in a direction transversal to said path; punch means movable between an inoperative position and an operative position for perforating the record carrier; holding means movable to and from an operative holding position engaging the record carrier for preventing movement of the same; first control means for moving said punch means between said positions; second control means for moving said punch means in a transporting direction and in an opposite return direction; third control means for moving said holding means between said inoperative and operative positions; and drive means for driving said first, second and third control means in timed relationship so that said second control means move said punch means in said operative position in said transporting direction while said holding means is in said inoperative position whereby the record carrier is transported along said predetermined path and so that said second control means move said punch means in said return direction while said punch means is in said inoperative position, and while said holding means is in operative position.

3. Punching and transporting apparatus for record carriers, comprising, in combination, means for guiding a record carrier along a predetermined stationary path and for preventing the record carrier from moving in a direction transversal to said path; punch means movable between an inoperative position and an operative position for perforating the record carrier; holding means movable to and from an operative holding position engaging the record carrier for preventing movement of the same and including eccentric means; first control means for moving said punch means between said positions and including eccentric means; second control means for moving said punch means in a transporting direction and in an opposite return direction and including eccentric means; third control means for moving said holding means between said inoperative and operative positions; and drive means for driving said first, second and third control means in timed relationship and including a shaft fixedly carrying said eccentric means so that said second control means move said punch means in said operative position in said transporting direction while said holding means is in said inoperative position whereby the record carrier is transported along said predetermined path and so that said second control means move said punch means in said return direction while said punch means is in said inoperative position, and while said holding means is in said operative position.

4. A punching and transporting apparatus comprising, in combination, reciprocable support means for guiding a record carrier along a predetermined stationary path and for preventing said record carrier from moving in a direction transversal to said path; punch means mounted on said support means for movement with the same and for movement in a direction transverse to said path between an inoperative position and an operative position for perforating a record carrier located along said path; first control means for moving said punch means between said positions thereof; second control means for reciprocating said support means with said punch means; and drive means for driving said first and second control means in such a timed relationship that said punch means are in said operative position and transport the record carrier along said path while said support means moves in one direction and so that said punch means are in said inoperative position while said support means moves in the opposite direction.

5. A punching and transporting apparatus comprising, in combination, reciprocable support means for guiding a record carrier along a predetermined stationary path and for preventing said record carrier from moving in a direction transversal to said path; punch means mounted on said support means for movement with the same and for movement in a direction transverse to said path between an inoperative position and an operative position for perforating a record carrier located along said path; holding means movable to and from an operative position engaging said record carrier for preventing movement of the same; first control means for moving said punch means between said positions thereof; second control means for reciprocating said support means with said punch means; third control means for moving said holding means between said inoperative and operative positions; and drive means for driving said first, second and third control means in such a timed relationship that said punch means are in said operative position and transport the record carrier along said path while said support means moves in one direction and so that said punch means are in said inoperative position and said holding means is in said operative position while said support means moves in the opposite direction.

6. A punching and transporting apparatus comprising, in combination, movable support means including an anvil portion and another portion defining a slot for receiving a record carrier and guiding the record carrier along a predetermined stationary path and for preventing the record carrier from moving in a direction transversal to said path; punch means mounted on said support means for movement with the same and for movement in a direction transverse to said path between an inoperative position and an operative position crossing said slot for perforating a record carrier located along said path in said slot; first control means for moving said punch means between said positions thereof; second control means for reciprocating said support means with said punch means; and drive means for driving said first and second control means in such a timed relationship that said punch means are in said operative position and transport the record carrier along said path while said support means moves in one direction and so that said punch means are in said inoperative position while said support means moves in the opposite direction.

7. A punching and transporting apparatus comprising, in combination, support means including a support frame and journal means for supporting said frame for rocking movement about an axis, said frame being formed with a slot for receiving a record carrier and reciprocating along a path during rocking movement of said frame, said support means guiding said record carrier along a predetermined stationary path which coincides with said first mentioned path and preventing said second carrier from moving in a direction transversal to said path; punch means mounted on said support frame for movement with the same and for movement in a direction transverse to said path between an inoperative position and an operative position crossing said slot for perforating a record carrier located along said path in said slot; first control means for moving said punch means between said positions thereof; second control means for reciprocating said support frame with said punch means; and drive means for driving said first and second control means in such a timed relationship that said punch means are in said operative position and transport the record carrier along said path while said support frame moves in one direction and so that said punch means are in said inoperative position while said support frame moves in the opposite direction.

8. An apparatus as set forth in claim 7 wherein said axis extends through the center of gravity of said support frame supporting said punch means.

9. A punching and transporting apparatus comprising, in combination, support means including a support frame and journal means for supporting said frame for rocking movement about an axis, said frame being formed with a slot for receiving a record carrier and reciprocating along a path during rocking movement of said frame, said support means guiding said record carrier along a predetermined stationary path which coincides with said first mentioned path and preventing said second carrier from moving in a direction transversal to said path; punch means including a plurality of punches mounted on said support frame for movement with the same and for movement in a direction transverse to said path between an inoperative position and an operative position crossing said slot for perforating a record carrier located along said path in said slot; first control means for moving said punch means between said positions thereof; selector means for coupling selected punches only with said first control means; second control means for reciprocating said support frame with said punch means; and drive means for driving said first and second control means in such a timed relationship that said selected punches are in said operative position and transport the record carrier along said path while said support frame moves in one direction and so that said selected punches are in said inoperative position while said support frame moves in the opposite direction.

10. A punching and transporting apparatus comprising, in combination, support means including a support frame and journal means for supporting said frame for rocking movement about an axis, said frame being formed with a slot for receiving a record carrier and reciprocating along a path during rocking movement of said frame, said support means guiding said record carrier along a predetermined stationary path which coincides with said first mentioned path and preventing said second carrier from moving in a direction transversal to said path; punch means including a plurality of punches mounted on said support frame for movement with the same and for movement in a direction transverse to said path between an inoperative position and an operative position crossing said slot for perforating a record carrier located along said path in said slot; first control means including a plurality of actuating levers connected to said punches, respectively, in the region of said axis for moving said punch means between said positions thereof; selector means for coupling selected punches only with said first control means; second control means for reciprocating said support frame with said punch means; and drive means for driving said first and second control means in such a timed relationship that said selected punches are in said operative position and transport the record carrier along said path while said support frame moves in one direction and so that said selected punches are in said inoperative position while said support frame moves in the opposite direction.

11. A punching and transporting apparatus comprising, in combination, support means including a support frame and journal means for supporting said frame for rocking movement about an axis, said frame being formed with a slot for receiving a record carrier and reciprocating along a path during rocking movement of said frame; punch means including a plurality of punches mounted on said support frame for movement with the same and for movement in a direction transverse to said path between an inoperative position and an operative position crossing said slot for perforating a record carrier located along said path in said slot; first control means including a plurality of actuating levers connected to said punches, respectively, in the region of said axis, an eccentric member, and means connecting said eccentric member with said actuating levers for moving said punch means between said positions thereof; selector means for coupling selected punches only with said first control means; second control means including a cam, and a cam follower on said support frame for reciprocating said support frame with said punch means; and drive means including a drive shaft fixedly carrying said eccentric member and said cam and actuating said first and second control means in such a timed relationship that said selected punches are in said operative position and transport the record carrier along said path while said support frame moves in one direction and so that said selected punches are in said inoperative position while said support frame moves in the opposite direction.

12. A punching and transporting apparatus comprising, in combination, support means including a support frame and journal means for supporting said frame for rocking movement about an axis, said frame being formed with a slot for receiving a record carrier and reciprocating along a path during rocking movement of said frame; punch means including a plurality of punches mounted on said support frame for movement with the same and for movement in a direction transverse to said path between an inoperative position and an operative position crossing said slot for perforating a record carrier located along said path in said slot; holding means movable to and from an operative position engaging said record carrier for preventing movement of the same; first control means including a plurality of actuating levers connected to said punches, respectively, in the region of said axis, an eccentric member, and means connecting said eccentric member with said actuating levers for moving said punch means between said position thereof; selector means for coupling selected punches only with said first control means; second control means including a cam, and a cam follower on said support frame for reciprocating said support frame with said punch means; third control means for moving said holding means between said inoperative and operative positions; and drive means including a drive shaft fixedly carrying said eccentric member and said cam and actuating said first, second and third control means in such a timed relationship that said selected punches are in said operative position and transport the record carrier along said path while said support frame moves in one direction and so that said selected punches are in said inoperative position and said holding means is in said operative position while said support frame moves in the opposite direction.

13. A punching and transporting apparatus as set forth in claim 12, wherein said cam includes two diametrically arranged circular cam track portions for holding said supporting frame selected time periods in the dead center positions of the reciprocating movement of said frame; and wherein said eccentric member is arranged and constructed to cause movement of said punches through said slot when said circular cam track portions are engaged by said follower, and said frame is in one of said dead center positions.

14. A punching and transporting apparatus as set forth in claim 12 wherein said support frame is of rectangular shape and wherein said portion thereof includes two parallel bars defining said slot, said bars being formed with aligned bores for said punches, the bar farther spaced from said axis constituting an anvil for said punches.

15. A punching and transporting apparatus as set forth in claim 14 wherein said support frame includes two lateral portions, one of said lateral portions having a slot forming a continuation of said slot so that the record carrier can be laterally inserted into said slots.

16. A punching and transporting apparatus as set forth in claim 15 wherein said lateral portions have bearing projections in the region of the center of gravity of said support frame, and wherein said journal means engage said bearing projections for turnably supporting said support frame for rocking movement so that said axis extends through the center of gravity of said support frame.

17. A punching and transporting apparatus as set forth in claim 16 wherein said follower is a roller mounted for turning movement on said support frame on the side of said axis remote from said slot.

18. A punching and transporting apparatus as set forth in claim 12 wherein said third control means include a cam fixedly carried by said drive shaft and cam follower means cooperating with said last mentioned cam; and wherein said holding means include a stationary clamping member located on one side of the record carrier and a movable clamping member located on the other side of the record carrier and being operatively connected with said cam follower means so as to move between said inoperative and operative positions for clamping the record carrier in said operative position.

19. A punching and transporting apparatus as set forth in claim 18 wherein said movable clamping member includes two arms and a clamping bar extending across the record carrier; and including a shaft supporting said arms for turning movement and adapted to guide the record carrier when the same is transported by said punches in the inoperative position of said movable clamping member.

20. A punching and transporting apparatus as set forth in claim 12 wherein said holding means include a holding member movable between said inoperative and operative positions, said holding member including a pin adapted to pass through a perforation of the record carrier in said operative position for blocking movement of the record carrier.

References Cited by the Examiner

FOREIGN PATENTS 799,596 8/58 Great Britain.

WILLIAM W. DYER, Jr., *Primary Examiner.*

WILLIAM S. LAWSON, *Examiner.*